March 29, 1966  E. B. MARJORAM ETAL  3,242,837
INDEXING FILM ADAPTER FOR CAMERA
Filed Nov. 21, 1963
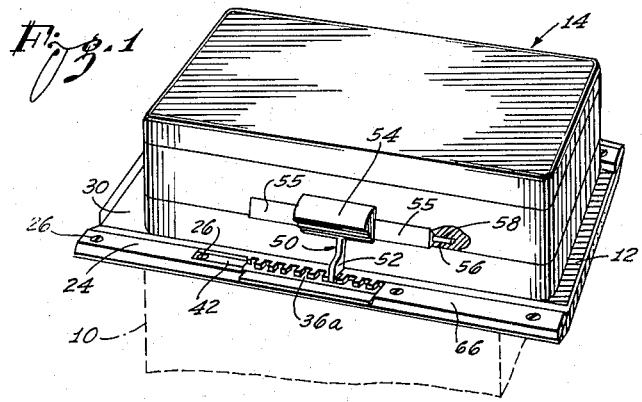
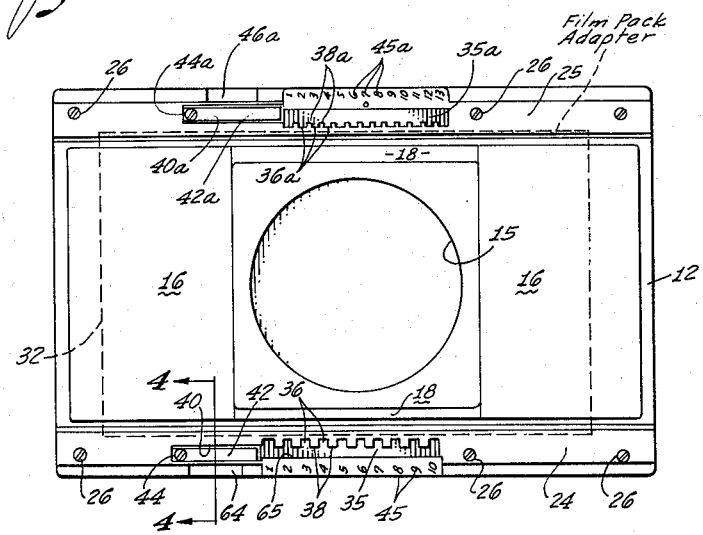
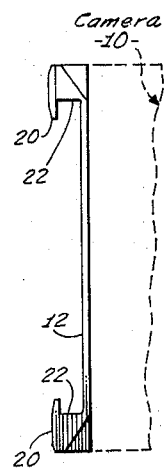
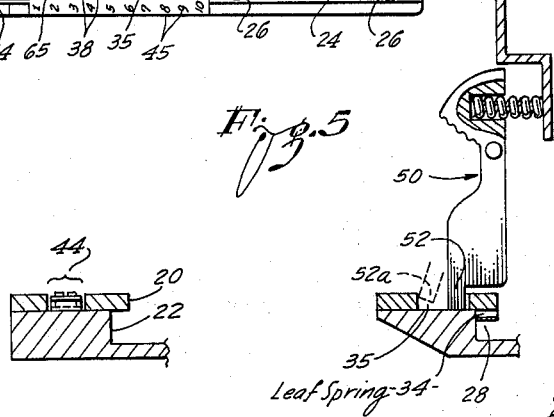
INVENTORS:
Ernest B. Marjoram
Edward C. H. Berg
Elwood R. Swanson
Attorney

United States Patent Office 3,242,837
Patented Mar. 29, 1966

3,242,837
INDEXING FILM ADAPTER FOR CAMERA
Ernest B. Marjoram, West Covina, Edward C. H. Berg, Orange, and Elwood R. Swanson, Garden Grove, Calif., assignors to Beattie-Coleman, Inc., Anaheim, Calif., a corporation of California
Filed Nov. 21, 1963, Ser. No. 325,246
7 Claims. (Cl. 95—37)

This invention relates to a camera and, more particularly, relates to a camera having a film adapter that is movable relative to the camera for the purpose of photographing a series of successive images on film in the adapter.

The invention has special utility in a camera assembly for photographically recording cathode-ray tube (CRT) traces. Typically, such an assembly comprises a camera with a removable film adapter together with a clamp housing or dark box which clamps onto a cathode-ray tube and encloses a space between the camera and the CRT screen.

It is common practice to photograph a number of successive CRT traces on a single piece of film not only for economy but also in some instances to group together a series of related data. For this purpose the camera includes a film adapter which may be constructed for either roll film or cut film and the film adapter is slidingly mounted on the camera body to permit the adapter to be shifted across the axis of the camera lens. To divide the film area into the required number of parts, a suitable indexing means is provided. For example, a first index means is commonly mounted on the camera to provide a series of equally spaced holes and a second index means on the film adapter is manually operable to releasably engage the spaced holes in succession.

It is desirable to afford a choice between two image sizes. For example, in using 72 mm. by 96 mm. film, the distance between the camera lens and the CRT screen may be adjusted to permit a series of thirteen successive trace images on a single film or the distance may be decreased to increase the size of the images with room for only ten images on the film. In practice it is repeatedly necessary to change from one of these two adjustments to the other and the problem to which the present invention is directed is how to expedite such a changeover.

Heretofore, the changeover from one image size to the other has required the time-consuming removal and replacement of parts. For example, in one conventional arrangement, the first indexing means is an indexing plate having two parallel rows of holes, one row of ten equally spaced holes and a second row of thirteen equally spaced holes, and this index plate is reversible to place the two rows of holes in operative positions selectively. In a typical arrangement, the index plate is releasably retained by two knurled thumb screws which must be removed and installed again each time the index plate is reversed for a changeover.

The important object of the present invention is to eliminate entirely the need for removing and reversing a dual index plate each time the operator shifts from one of the two image sizes to the other. To achieve this object, the invention teaches the use of three index means. The first index means is an index plate located on one side of the camera and having a row of ten equally spaced index recesses; the second index means is an index plate located on the other side of the camera and having thirteen equally spaced index recesses; and the third index means is a retractable pawl located on one side of the film adapter for cooperation with the two index plates selectively.

In such an arrangement, the changeover from increments of adapter shift of one magnitude to increments of adapter shift of the other magnitude is accomplished simply by reversing the film adapter end for end relative to the camera thereby shifting the retractable pawl on the adapter from one of the two index plates to the other. As will be explained, one feature of the invention is that when the film adapter is initially slid into position on the camera, the releasable indexing pawl automatically stops at the first indexing recess in the selected index plate. Another feature is that the indexing pawl is releasably captivated by the selected index plate to limit the range of relative movement of the film adapter to the desired range of index positions and thus prevent inadvertent fogging of the film by sliding the film adapter too far.

The features and advantages of the invention may be understood from the following detailed description and the accompanying drawings.

In the drawings, which are to be regarded as merely illustrative:

FIG. 1 is a perspective view of the presently preferred embodiment of the invention showing a film adapter mounted on a camera;

FIG. 2 is an elevational view of the rear end of a camera on an enlarged scale showing the two indexing plates on the opposite sides of the path of relative movement between the film adapter and the camera;

FIG. 3 is an end elevational view of the structure shown in FIG. 2 with the camera shown in phantom;

FIG. 4 is a fragmentary transverse section along the line 4—4 of FIG. 2; and

FIG. 5 is a fragmentary transverse section along the line 5—5 of FIG. 1 showing the construction of the indexing pawl on the film adapter.

Referring to the drawings which illustrate the presently preferred embodiment of the invention, a camera 10, shown in phantom in FIGS. 1 and 3, is provided with the usual transverse back plate 12 shown in solid lines in FIGS. 1, 2 and 3 for sliding engagement with a film pack adapter 14 shown in FIG. 1. As indicated in FIG. 2, the back plate 12 is formed with a circular opening 15 concentric to the optical axis of the camera through which light passes from the lens of the camera to the film carried by the adapter 14. The back plate 12 is further provided with two extensive end areas 16 and two narrower side areas 18 that are covered with black velvet to serve as a light seal in cooperation with the adapter throughout the range of operative shift of the adapter relative to the camera.

As shown in FIG. 3, the back plate 12 is formed with two opposite overhanging side flanges 20 whereby the back plate forms a longitudinal channel with overhanging sides to receive the film adapter in a well known sliding manner. In the construction shown, the back plate 12 is a die casting formed with longitudinal side ribs 22 (FIGS. 3 and 4) and the overhanging side flanges 20 are respectively formed by longitudinal metal plates 24 and 25 which are attached to the side ribs by suitable screws 26.

The film adapter 14 is of the usual construction having a longitudinal side flange 28 (FIG. 5) on each of its sides in sliding engagement with the corresponding longitudinal side flange 20 of the back plate 12. The face of the film adapter 14 towards the back plate 12 is equipped with the usual dark slide 30 in a well known manner, the dark slide may be retracted to permit exposure of the film when the adapter is on the camera and may be advanced to its closed position to prevent fogging of the film when the film adapter is removed from the camera.

The dotted rectangle 32 in FIG. 2 shows the dimension of the film pack adapter relative to the back plate 12 and shows how the two end areas 16 of velvet permit a substantial range of shift of the film pack relative to the back plate without permitting light to leak into the camera. The adapter 14 is pressed into effective contact with the velvet areas 16 and 18 by the usual leaf springs 34 (FIG. 5) which press against the undersides of the overhanging flanges 20 of the back plate 12.

A feature of the present invention is that each of the two side plates 24 and 25 on the camera not only serves its primary purpose of slidably engaging the film adapter but also serves the additional purpose of an index plate. The longitudinal side plate 24 is provided with a longitudinal index channel 35 and the inner longitudinal edge of this channel is notched to form a series of equally spaced index elements in the form of recesses 36 separated by teeth 38. Communicating with one end of the index channel 35 is a recess in the form of a longitudinal release channel 40. The longitudinal release channel 40 is covered by a longitudinal leaf spring 42 that is anchored to the side plate by a suitable screw 44. The leaf spring is flush with the top surface of the side plate 24 with the free end of the leaf spring at the juncture of the release channel 40 with the index channel 35. Preferably the ten index recesses 36 are designated by ten corresponding index numerals 45. To facilitate manual depression of the leaf spring 34 a portion of the side plate adjacent the release channel 40 may be cut away to form a depression 46.

The second side plate 25 is constructed in the same manner to function as a second index plate, as indicated by the use of corresponding numerals to indicate corresponding parts, but in this instance the index channel 35 is cut away along its inner side to provide fifteen equally spaced index recesses 36a instead of ten index recesses, the thirteen index recesses being designated by corresponding index numerals 45a. The index channel 35a communicates with a release channel 40a which is covered by a leaf spring 42a and the side plate is cut away adjacent the release channel to form a depression 46 to facilitate manual inward flexure of the leaf spring.

In accord with the teaching of the invention, the film adapter 14 is provided with a pivoted index pawl, generally designated 50, to cooperate selectively with the two index channels 35 and 35a and to engage the successive index recesses 36 and 36a in the two index channels respectively. Obviously such an index pawl may be of any construction suitable for cooperation with the two index plates 24 and 25.

In the present embodiment of the invention, as shown in FIG. 1, the index pawl 50 comprises an index finger 52 carried by a serrated handle 54. The serrated handle 54 is formed with two opposite lateral extensions 55 which terminate respectively in two opposite trunnions 56 that are journaled in suitable socket 58 in the film adapter 14 to permit the index pawl to rock about the axes of the two trunnions. A concealed coil spring 60 (FIG. 5) urges the index pawl 50 counterclockwise as viewed in FIGS. 1 and 5 to bias the index finger 52 for cooperation with the two sets of index recesses 36 and 36a. It is apparent that the serrated face 36 of the index pawl 50 may be subjected to finger pressure to rock the index pawl clockwise as required to release the index finger 52 from an index recess 36 or 36a.

FIG. 5 shows in solid lines the normal position of the index pawl 50 in engagement with an index recess 36.

FIG. 5 also shows how the index finger 52 is captivated by the index channel 35, the index channel preventing freedom for the index pawl to swing out of the channel. Thus at the dotted position of the index pawl indicated at 52a, the index finger abuts the outer side edge of the index channel 35 to limit the upward swinging movement of the index finger.

On the other hand, each of the two release channels 40 and 40a is located and dimensioned to permit the index finger 52 to swing freely into and out of the release channel. Thus, as may be seen in FIG. 2, the outer longitudinal edge 64 of the release channel 40 is offset outward from the corresponding outer longitudinal edge 65 of the index channel 35 to provide clearance for the index finger 52 to swing clear of the release channel. In effect the release channel is a normally closed recess which may be opened to increase the effective dimension of the index channel.

OPERATION

The film adapter 14 is oriented lengthwise of the camera in accord with whichever of the two index plates 24 and 25 is to be used to divide the film into image areas. In FIG. 1 the film adapter 14 is oriented to cooperate with the index plate 24 to divide the length of the film into ten image areas and, of course, the distance of the camera lens from the CRT screen is adjusted to provide images of the desired size. If it is desired to divide the film into thirteen image areas, the film adapter in FIG. 1 is reversed end for end to place the index pawl 50 on the opposite side to cooperate with the second index plate 25 and the distance of the camera lens from the CRT screen is decreased accordingly.

With the film adapter 14 loaded with film and with the dark slide 30 in its closed position, the index pawl 50 may be retracted by finger pressure to permit the film adapter to be introduced into one end of the wide channel formed by the back plate 12 of the camera, the film adapter being introduced at the end of the channel that is nearest to the two leaf springs 42 and 42a. With the film pack adapter oriented as shown in FIG. 1 and introduced from the right, the retracted index pawl 50 may be released when it reaches the area designated 66 of the index plate 25 to permit the index pawl to be urged by its spring into contact with the side plate. The film adapter may then be slid lengthwise to carry the index pawl towards the index channel 35a.

When the spring-pressed index finger 52 reaches the leaf spring 42a it may or may not depress the leaf spring but in any event when the index finger passes beyond the free end of the leaf spring it snaps into engagement with the first index recess 36a. When the first trace image has been photographed on the film the index finger 52a is manually retracted to permit advancement of the film adapter to register the index finger with the second index recess 36a. Since the index finger 52 cannot be swung clear of the index channel 35a, the range of relative movement of the film pack adapter is limited to the length of the index channel 35a.

To remove the film adapter from the camera either for the purpose of reloading the film adapter or for the purpose of changing over from use of one of the two index plates 24 and 25 to use of the other, finger pressure is applied to the serrated handle 54 of the index pawl and the leaf spring 42a is depressed by finger pressure to permit the index finger 52 to move into the release channel 40a. The finger pressure applied to the serrated handle of the index pawl then swings the index finger 52 out of the release channel 40a to permit the film adapter to be slid out of engagement with the camera.

Our description in specific detail of the selected embodiment of the invention will suggest various changes, substitutions and other departures from our disclosure within the spirit and scope of the appended claims.

We claim:

1. Means to index the shift of a film adapter relative to a camera body in relatively small increments and in relatively large increments selectively to divide film in the adapter into image areas of two different sizes selectively, comprising:
  a first index means on one of the adapter and the body adjacent one side of the path of relative movement between the adapter and the body;
  a second index means on said one of the adapter and the body adjacent the other side of the path of relative movement;
  and a third index means on the other of the adapter and the body for cooperation with the first and second index means selectively, said third index means being located on one side of said other of said adapter and said body to cooperate with the first index means at one longitudinal orientation of the adapter relative to the path and to cooperate with the second index means at the other longitudinal orientation of the film adapter relative to the path,
  each of said first and second index means forming a longitudinal channel with a longitudinal series of index elements adjacent one side of the channel, the spacing of the successive elements of one series being larger than the spacing of the successive elements of the other series,
  said third index means having an index member pivoted for arcuate movement to releasably engage the index elements selectively, each of said channels being dimensioned to curtail the arcuate release movement of the index member to prevent removal of the index member from the channel thereby to limit the range of relative shift of the film adapter to the length of the channel;
  and manually operable means to release the index member from each of the two channels to permit the adapter to be shifted out of engagement with the camera body.

2. Means to index the shift of a film adapter relative to a camera body in relatively small increments and in relatively large increments selectively to divide film in the adapter into image areas of two different sizes selectively, comprising:
  a first index means on one of the adapter and the body adjacent one side of the path of relative movement between the adapter and the body;
  a second index means on said one of the adapter and the body adjacent the other side of the path of relative movement;
  and a third index means on the other of the adapter and the body for cooperation with the first and second index means selectively, said third index means being located on one side of said other of said adapter and said body to cooperate with the first index means at one longitudinal orientation of the adapter relative to the path and to cooperate with the second index means at the other longitudinal orientation of the film adapter relative to the path,
  each of said first and second index means forming a longitudinal channel with a longitudinal series of index elements adjacent one side of the channel, the spacing of the successive elements of one series being larger than the spacing of the successive elements of the other series,
  said third index means having an index member pivoted for arcuate movement to releasably engage the index elements selectively, each of said channels being dimensioned to curtail the arcuate release movement of the index member to prevent removal of the index member from the channel thereby to limit the range of relative shift of the film adapter to the length of the channel;
  and manually operable means to increase the effective dimensions of the two index channels respectively to release the index member therefrom to permit the adapter to be shifted out of engagement with the camera body.

3. A combination as set forth in claim 2 in which said manually operable means comprises:
  a recess adjacent each of the two index channels dimensioned to permit release of the index member;
  and means adjacent each recess normally blocking entrance of the index member into the recess, said blocking means being retractable to an ineffective position.

4. Means to index the shift of a film adapter relative to a camera body in increments to divide film in the adapter into a plurality of image areas, comprising:
  a first index means on one of said adapter and body adjacent the path of relative shift;
  a second index means on the other of said adapter and body positioned to cooperate with the first index means,
  said first index means forming a longitudinal channel formed with a longitudinal series of index elements,
  said second index means having an index member pivoted for arcuate movement to releasably engage the index elements selectively, said channel being dimensioned to curtail the arcuate release movement of the index member to prevent disengagement of the index member from the channel thereby to limit the range of shift of the film adapter to the length of the channel;
  and manually operable means to release the index member from the channel to permit the adapter to be shifted out of engagement with the camera body.

5. Means to index the shift of a film adapter relative to a camera body in increments to divide film in the adapter into a plurality of image areas, comprising:
  a first index means on one of said adapter and body adjacent the path of relative shift;
  a second index means on the other of said adapter and body positioned to cooperate with the first index means,
  said first index means forming a longitudinal channel formed with a longitudinal series of index elements;
  said second index means having an index member pivoted for arcuate movement to releasably engage the index elements selectively, said channel being dimensioned to curtail the arcuate release movement of the index member to prevent disengagement of the index member from the channel thereby to limit the range of shift of the film adapter to the length of the channel,
  said first index means having a recess adjacent one end of the index channel, the recess being dimensioned to permit the index member to swing free from the first index means to permit the adapter to be shifted out of engagement with the camera body;
  and means normally blocking entrance of the index member into the recess from the index channel, said blocking means being retractable to an ineffective position to permit entrance of the index member into the recess.

6. A combination as set forth in claim 5 in which said blocking means is a leaf spring adapted for deflection by finger pressure to its ineffective position.

7. Means to index the shift of a film adapter relative to a camera body in increments to divide film in the adapter into a plurality of image areas, comprising:
  a first index means on one of said adapter and body adjacent the path of relative shift;
  a second index means on the other of said adapter and body positioned to cooperate with the first index means,
  said first index means having a longitudinal channel formed with a longitudinal series of index elements,
  said second index means having an index member pivoted for arcuate movement to releasably engage the index elements selectively, said channel being dimensioned to curtail the arcuate release movement of the index member to prevent disengagement of the index member from the channel thereby to limit the range of shift of the film adapter to the length of the channel;

and manually operable means to increase the effective dimension of the index channel to permit the index member to swing free from the index channel to permit the adapter to be shifted out of engagement with the camera body.

References Cited by the Examiner

UNITED STATES PATENTS

| | | | |
|---|---|---|---|
| 1,045,539 | 11/1912 | Folmer | 95—37 |
| 2,335,697 | 11/1943 | Reyniers | 95—37 X |
| 2,788,705 | 4/1957 | Huebner | 95—37 |

JOHN M. HORAN, *Primary Examiner.*